F. W. FERNHOLTZ.
MECHANISM FOR CONVERTING ROTARY MOTION INTO RECIPROCATING MOTION.
APPLICATION FILED APR. 8, 1918. RENEWED APR. 10, 1922.
1,420,826.
Patented June 27, 1922.
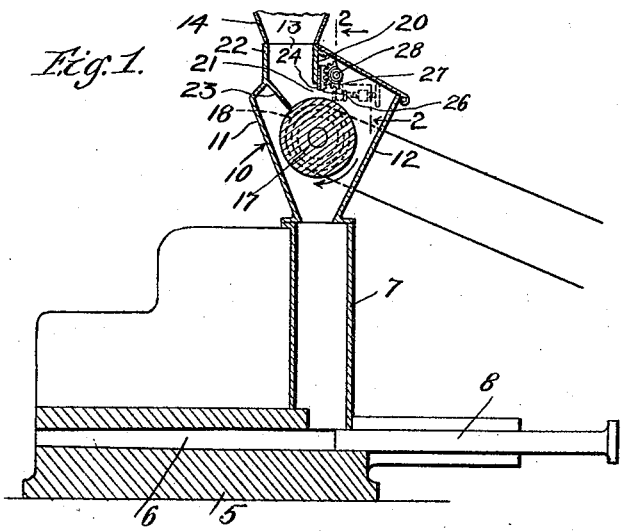
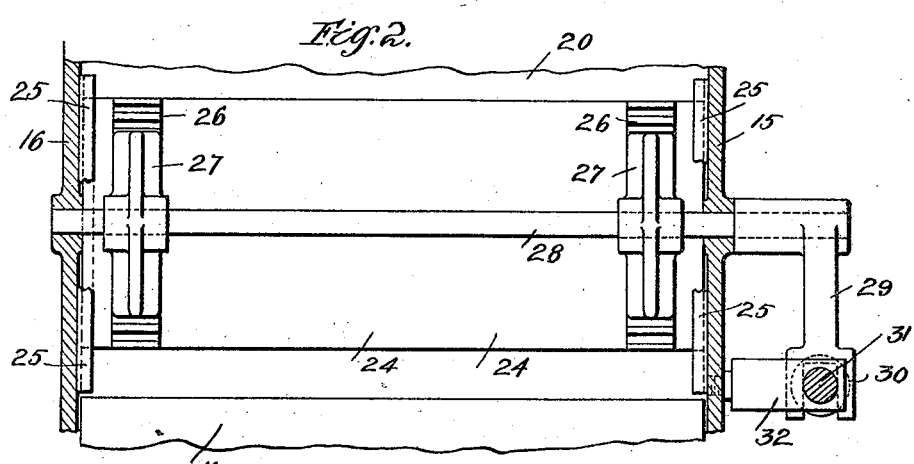
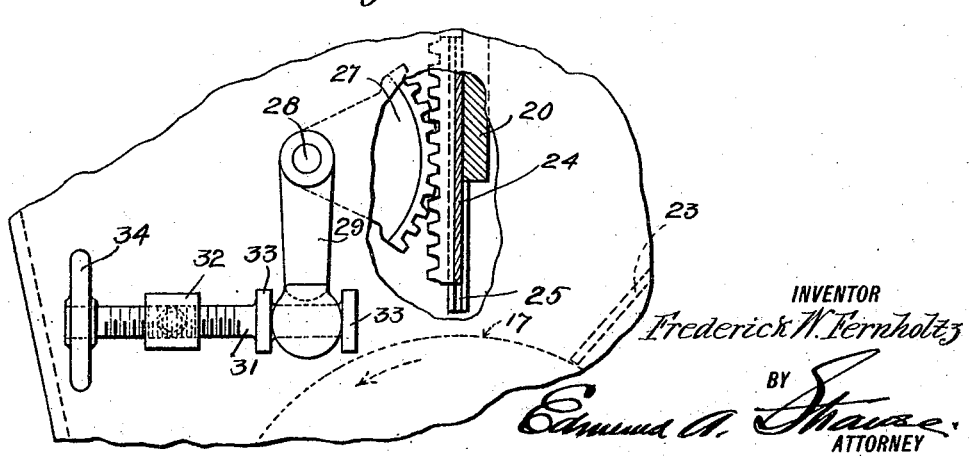
INVENTOR
Frederick W. Fernholtz
BY
Edmund A. Strause
ATTORNEY

UNITED STATES PATENT OFFICE.

FREDERICK W. FERNHOLTZ, OF LOS ANGELES, CALIFORNIA.

MECHANISM FOR CONVERTING ROTARY MOTION INTO RECIPROCATING MOTION.

1,420,826.　　　　　　　Specification of Letters Patent.　Patented June 27, 1922.

Application filed April 8, 1918, Serial No. 227,237. Renewed April 10, 1922. Serial No. 551,213.

*To all whom it may concern:*

Be it known that I, FREDERICK W. FERN-HOLTZ, a citizen of the United States, residing at Los Angeles, in the county of Los Angeles and State of California, have invented new and useful Improvements in Mechanism for Converting Rotary Motion into Reciprocating Motion, of which the following is a specification.

My invention has relation more particularly to a regulating mechanism adapted for use in connection with hoppers for feeding and delivering granular materials in predetermined quantities.

It is a main object of my invention to provide an adjustable regulating mechanism for material feeding hoppers, whereby a predetermined quantity of granular material may be continuously delivered therefrom.

A further object is to provide a hopper feed regulating mechanism that is positive in adjustment, economical of manufacture, and highly efficient in operation.

I accomplish the above objects by means of the mechanism herein described and illustrated in the accompanying drawings, in which:

Fig. 1 is a central longitudinal section through the forward end of a briqueting press, showing the feed hopper and my regulating mechanism in place therein.

Fig. 2 is an enlarged transverse section through the hopper, taken on line 2—2 of Fig. 1.

Fig. 3 is an enlarged detail view of one of the side walls of the hopper, showing the feed regulating mechanism, parts being broken away and in section to more clearly disclose the mechanism.

In feeding granular materials, such as lignite, to die molds in briqueting operations, it has been found highly desirable to feed the exact quantity of material to the die mold required to form a briquet before the compressing operation. As lignites differ greatly in their physical characteristics, some being more plastic than others, it has been found almost impossible to deliver the same to the die molds in an exact quantity to form a briquet of a predetermined size and weight. By means of my improved mechanism the material from the hopper, whatever its condition may be, will be uniformly fed to the molds in the exact amount required.

Referring more specifically to the drawings, 5 designates the feed end of a briqueting press illustrated diagrammatically having a die mold 6 horizontally disposed therein and a vertically extending material chute 7 at the rear end, the lower end of said hopper communicating with the die mold cavity at the rear thereof. The press 5 is provided with the usual compressing plunger 8 which is operatively connected to a reciprocating mechanism, not shown.

Mounted on the upper end of chute 7 and secured thereto in any suitable manner is a material hopper 10, the front and rear walls 11 and 12 being inclined away from each other to enlarge the hopper adjacent the upper end thereof. The lower end of the hopper opens into the material chute 7 and the upper end is provided with an inlet opening 13 which communicates with a material delivery chute 14. Rotatably mounted in bearings formed in the side walls 15 and 16 of the hopper is a transversely disposed rotating feed drum 17, one end of the drum shaft being provided with a pulley 18 which is belted to the reciprocating mechanism of the briqueting press, not shown. Hopper 10 is provided adjacent its inlet with a transversely disposed wall 20, the end of said wall terminating short of the periphery of the rotating drum 17 and forming a feed opening 21 through which the material passes downwardly to the material chute 7 connected to the press.

Transversely disposed within the feed hopper and above the feeding drum 17, is a deflector plate 23 which serves to direct the material delivered to the hopper towards the feed opening 21. The size of the feed opening is controlled by a vertically disposed sliding gate or shutter 24, the ends of said gate moving in guide ways 25 secured to, or formed on the inner surface of the hopper walls 15 and 16 in any suitable manner. Vertically secured to the outer face of gate 24 are rack bars 26, one at each end, said rack bars being geared to the sectors 27 rigidly secured to the ends of a rotating shaft 28 mounted in bearings formed in the side walls 15 and 16 of the feed hopper. One end of shaft 28 projects through wall 15 of the hopper and is provided on the end thereof with a downwardly projecting lever 29, the free end of said arm being forked as at 30, and straddling a threaded adjusting shaft 31 mounted in an exteriorly threaded bearing 32 secured to the side wall 15 of the hopper. The outer end of shaft 31 is provided with annular collars 33, one on either side of the forked end of lever 29, adapted to rock said lever when shaft 31 is rotated, through the medium of hand wheel 34, secured to the outer end thereof.

The operation of my feed regulating mechanism will be clearly apparent from the above description, and it will be noted that by means of the rack bars and their connecting mechanisms that I am enabled to move the vertically disposed gate 24 upwardly or downwardly, and thus increase or diminish the size of the feed opening 21 to suit the condition of the lignite being fed therethrough.

It will be further noted that by threading the adjusting shaft 31 that I am enabled to obtain an extremely fine adjustment of the feed opening, also by means of the rotating drum all danger of the material clogging is eliminated, the drum slightly agitating the material as it is fed through the feed opening.

What I claim is:

1. A mechanism for converting a rotary motion into a reciprocating motion, comprising a sliding member provided with a rack-bar, a pivoted toothed member adapted to engage with said rack-bar, a threaded adjusting shaft mounted in a threaded bearing arranged adjacent said toothed member, and means connecting said toothed member and adjusting shaft, whereby when said adjusting shaft is rotated the toothed member will actuate the sliding member.

2. A mechanism for converting a rotary motion into a reciprocating motion, comprising a sliding member provided with a rack-bar, a pivoted toothed member adapted to engage with said rack-bar, a threaded adjusting shaft mounted in a threaded bearing arranged adjacent said toothed member and provided with a hand wheel on one end and a pair of collars on its opposite end, and a forked arm secured to said toothed member and adapted to straddle the adjusting shaft and engage between said collars.

In witness that I claim the foregoing I have hereunto subscribed my name this 9th day of March, 1918.

F. W. FERNHOLTZ.